United States Patent
Dugast et al.

(10) Patent No.: US 12,375,390 B2
(45) Date of Patent: Jul. 29, 2025

(54) MEMORY POOLED TIME SENSITIVE NETWORKING BASED ARCHITECTURES

(71) Applicant: Intel Corporation, Santa Clara, CA (US)

(72) Inventors: Francois Dugast, Karlsruhe (DE); Francesc Guim Bernat, Barcelona (ES); Durgesh Srivastava, Cupertino, CA (US); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 17/404,736

(22) Filed: Aug. 17, 2021

(65) Prior Publication Data

US 2021/0377150 A1   Dec. 2, 2021

(51) Int. Cl.
| | |
|---|---|
| *H04L 45/121* | (2022.01) |
| *G06F 11/07* | (2006.01) |
| *G06F 12/1027* | (2016.01) |
| *G06F 13/16* | (2006.01) |
| *H04L 43/0864* | (2022.01) |
| *H04L 43/0894* | (2022.01) |
| *H04L 45/12* | (2022.01) |
| *H04L 45/125* | (2022.01) |
| *H04L 45/74* | (2022.01) |

(52) U.S. Cl.
CPC .......... *H04L 45/121* (2013.01); *G06F 11/073* (2013.01); *G06F 12/1027* (2013.01); *G06F 13/161* (2013.01); *G06F 13/1689* (2013.01); *H04L 43/0864* (2013.01); *H04L 43/0894* (2013.01); *H04L 45/124* (2013.01); *H04L 45/125* (2013.01); *H04L 45/74* (2013.01); *G06F 2213/3808* (2013.01)

(58) Field of Classification Search
None
See application file for complete search history.

(56) References Cited

U.S. PATENT DOCUMENTS

| | | | |
|---|---|---|---|
| 10,599,596 B2 * | 3/2020 | Pan | G06F 1/3296 |
| 10,924,548 B1 * | 2/2021 | Karumbunathan | G06F 3/0688 |
| 11,409,685 B1 * | 8/2022 | Kaplan | H04L 67/1095 |
| 11,652,848 B1 * | 5/2023 | Talur | H04L 63/0236 726/1 |
| 12,019,562 B2 * | 6/2024 | LeMay | G06F 12/0831 |
| 2016/0078342 A1 * | 3/2016 | Tang | G06F 9/45558 706/47 |
| 2020/0259896 A1 * | 8/2020 | Sachs | H04L 67/12 |

(Continued)

OTHER PUBLICATIONS

"Berkeley Packet Filter," Wikipedia, http://en.wikipedia.org/wiki/Berkeley_Packet_Filter. Accessed Aug. 9, 2021. (5 pgs.).

(Continued)

*Primary Examiner* — Henry Tsai
*Assistant Examiner* — Christopher A Bartels
(74) *Attorney, Agent, or Firm* — Alliance IP, LLC (57) ABSTRACT

A system comprising a traffic handler comprising circuitry to determine that data of a memory request is stored remotely in a memory pool; generate a packet based on the memory request; and direct the packet to a path providing a guaranteed latency for completion of the memory request.

20 Claims, 4 Drawing Sheets

(56) References Cited

U.S. PATENT DOCUMENTS

| | | | |
|---|---|---|---|
| 2021/0117360 A1* | 4/2021 | Kutch | G06F 3/0656 |
| 2021/0243247 A1* | 8/2021 | He | H04L 67/51 |
| 2022/0103593 A1* | 3/2022 | Singh | H04L 63/0245 |
| 2022/0247696 A1* | 8/2022 | He | H04L 49/9057 |
| 2022/0292543 A1* | 9/2022 | Henderson | G06Q 30/0252 |
| 2022/0321471 A1* | 10/2022 | Deb | H04L 45/74 |
| 2023/0027329 A1* | 1/2023 | Durham | G06F 21/54 |

OTHER PUBLICATIONS

"IEEE Standard for Local and Metropolitan Area Network—Bridges and Bridged Networks," in IEEE Std 802.1Q-2018 (Revision of IEEE Std 802.1Q-2014), vol. no., pp. 1-1993, Jul. 6, 2018, doi: 10.1109/IEEESTD.2018.8403927 (1993 pgs.).

"Time-Sensitive Networking (TSN)," Wikipedia, http://en.wikipedia.org/wiki/Time-Sensitive_Networking. Accessed Aug. 9, 2021. (15 pgs.).

* cited by examiner

MEMORY POOLED TIME SENSITIVE NETWORKING BASED ARCHITECTURES

FIELD

The present disclosure relates in general to the field of computer development, and more specifically, to memory pooled time sensitive networking based architectures.

BACKGROUND

Memory pooling provides a way for multiple computing platforms to map and use memory from a memory pool on an as needed basis. Memory pooling provides the ability for systems to efficiently handle situations in which there are spikes in memory capacity needs. As just one example, at the end of a payroll period, a system may run resource intensive database queries which require large amounts of memory capacity. Instead of having to overprovision memory to handle this worst case scenario, the system could alternatively leverage memory available in the memory pool for this purpose.

BRIEF DESCRIPTION OF THE DRAWINGS

Like reference numbers and designations in the various drawings indicate like elements.

DETAILED DESCRIPTION

Figure 1:
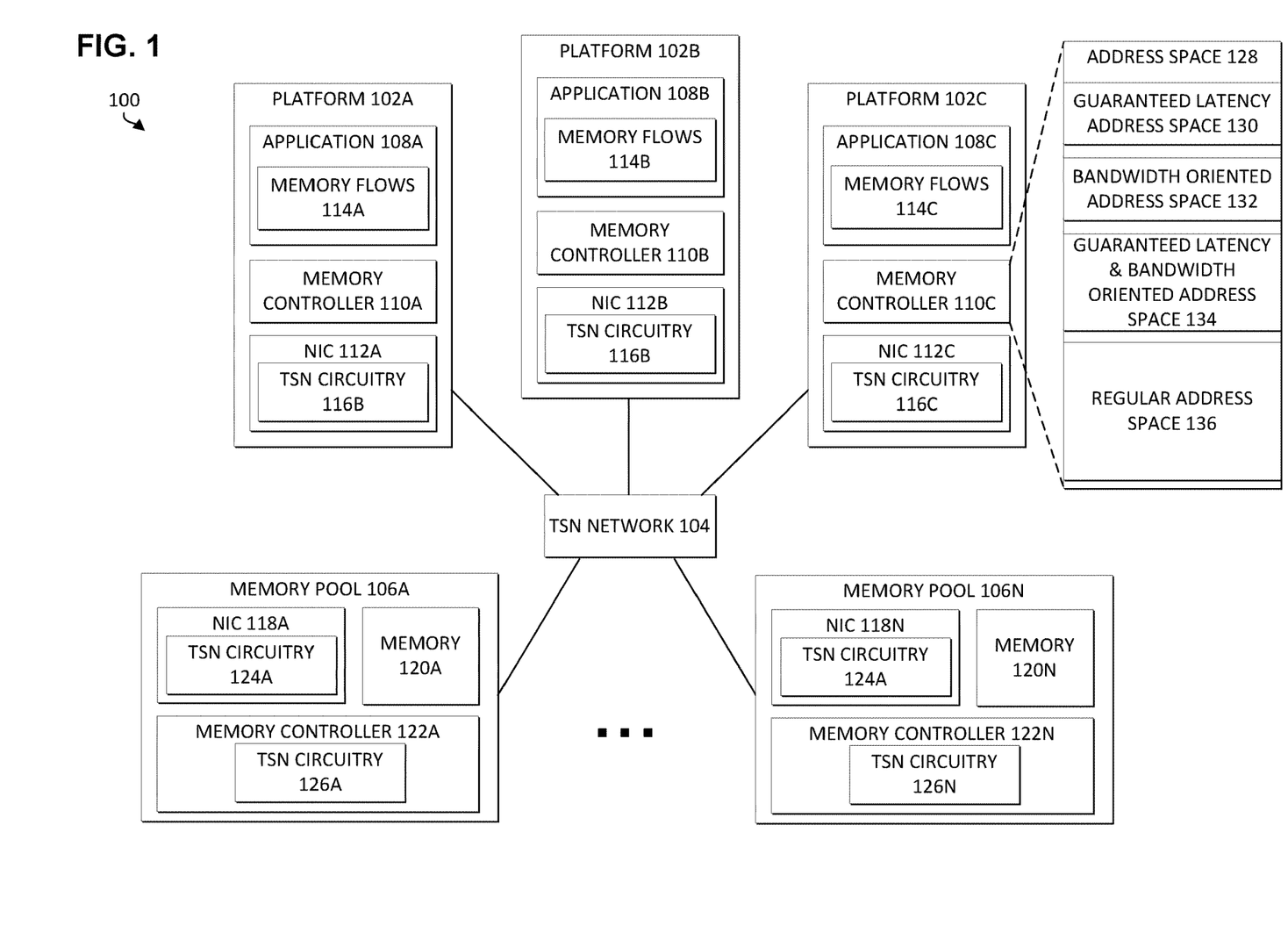
FIG. 1 illustrates a system comprising a memory pooled time sensitive networking (TSN) based architecture in accordance with certain embodiments.

FIG. 1 illustrates a system 100 comprising a memory pooled time sensitive networking (TSN) based architecture in accordance with certain embodiments. System 100 includes platforms 102 (e.g., 102A, B, and C) coupled via a TSN network 104 to memory pools 106 (e.g., 106A, . . . 106N).

Memory pooling may be used in a wide variety of domains, including domains in which it is important to be efficient with resource provisioning. This may include domains such as edge computing, in which power may be conserved by using a memory pool to improve efficiency, and cloud computing, in which memory capacity heavy instances tend to be very expensive relative to use of a memory pool. Various use cases that may utilize memory pooling include factory automation processes, autonomous vehicles, robotics, and augmented reality applications, among others.

A key requirement for various applications is the execution of certain flows that require predictable and deterministic latencies. In general, the overall response time of an application may be heavily dependent on low and predictable memory access latencies. While memory pooling may provide the ability to add several platforms to a system (with different platforms mapping to different parts of the memory pool) and to scale memory capacity on demand for applications that are memory intensive, contention among requests among other issues may present challenges to applications that rely on deterministic latencies for memory accesses.

In various embodiments of the present disclosure, capabilities for time sensitive networking (TSN) are included in the memory pooling infrastructure. The platforms 102 may leverage TSN-based connectivity in addition to regular connectivity (e.g., in which a maximum latency is not guaranteed) to a memory pool. TSN achieves determinism over the network (e.g., an Ethernet network) by leveraging time synchronization and a schedule that is shared between network components. In embodiments, the architecture defines queues based on time, thereby guaranteeing a bounded maximum latency for scheduled traffic through switched networks to the memory in the memory pools. Various embodiments may allow for the convergence of many traffic classes and multiple applications in one network.

TSN enables low latency deterministic communication in systems in which there could be contention due to multiples platforms accessing a memory pool. Various embodiments include pooled memory architectures that leverage TSN controllers and a TSN infrastructure in order to achieve latency determinism on the network 104 and in the memory access logic of the platforms 102 and memory pools 106 (e.g., home agents, memory controllers, etc.). In various embodiments, the memory controller (e.g., 122) of a memory pool has certain request queues that are dedicated to traffic coming through a TSN channel. The schedules of the memory controller (e.g., 122) for processing requests in these queues may guarantee fixed latency for TSN queues and best effort for the other queues. In various embodiments, a NIC driver may own (e.g., control) a NIC 118 and receive requests. Incoming packets may be identified (for example using a VLAN ID) depending on the channel they are coming from. Requests may be buffered in queue, although this may introduce indeterminism. In various embodiments, the deterministic nature of TSN may be leveraged to guarantee only a certain number of requests (credit) for each client for a given time frame. In this case, queueing may occur on the requester side.

In various embodiments, the system 100 may provide guaranteed latency for certain types of memory regions. For example, a novel memory address space (e.g., guaranteed latency address space 130) in a host (e.g., platform 102C) may expose access to memory with no jitter and fixed latency (e.g., a maximum guaranteed latency) for memory requests. Thus, in some embodiments, an end-to-end channel is setup between the host (e.g., a platform 102) and the memory controller (e.g., 122) of a memory pool (e.g., 106) that guarantees a fixed latency for requests referencing an address within a particular memory address range. As the latency is fixed at each step of the path between the host and the remote memory in the memory pool, memory pooling traffic benefits from guaranteed latency along the end-to-end channel which makes this remote memory suitable for use as memory pool with controlled overhead. In various embodiments, a system address decoder, translation lookaside buffer (TLB), or other memory management logic exposed to an operating system of a platform 102 are expanded in order to manage memory within this memory address range.

In the embodiment depicted, a platform 102 (e.g., 102A-C) may execute an application 108 (e.g., 108A-C) that includes various memory flows 114 (e.g., 308A-C). The platform may include a memory controller 110 (e.g., 110A-C), and a network interface controller (NIC) 112 (e.g., 112A-C, also known as a network interface card or network adapter) comprising TSN circuitry 116 (e.g., 116A-C).

Application 108 may be executed by logic (e.g., a processor) of a platform 102 to perform any suitable operations (such as operations associated with any of the use cases described above or other suitable operations). The application 108 may be associated with application code that is executed by the platform 102. In various embodiments, the application code may be stored within memory of the platform 102 and/or within memory 120 of a memory pool 106.

Execution of the application 108 may include executing various memory flows 114, where a memory flow may comprise any number of reads from or writes to memory. The memory may be local to the platform or remote from the platform (e.g., within memory 120 of a memory pool 106).

The memory flows may be of various types. In one example, a memory flow may be a bandwidth oriented flow. For example, the memory flow may be provided with a guaranteed amount of average bandwidth, maximum burst bandwidth, or other suitable bandwidth metric. As another example, a memory flow may be a flow with guaranteed latency, where the latency may include, e.g., an elapsed amount of time between a request for memory contents and retrieval of the memory contents for access by the requester (e.g., application executing the memory flow). In various embodiments, the latency that is guaranteed may be for any suitable portion of the request path. For example, the latency may be guaranteed for the amount of time from when a request is received at a memory controller 110 up to the time the data is received back at the memory controller 110. As another example of a type of memory flow, a memory flow may be bandwidth oriented and may also have a guaranteed latency. As one more example, a memory flow may be a lower priority memory flow and may rely on best efforts to retrieve the memory (and thus may have neither a guaranteed bandwidth nor latency).

In various embodiments, processor-addressable memory on the platform includes both memory local to the platform as well as remote memory (e.g., one or more memories 120 of one or more memory pools 106). That is, an application 108 that is executed by a processor of the platform may request memory access using a virtual address that may refer a location in memory that is local to the platform or memory that is remote from the platform (e.g., a memory 120 of a memory pool 106).

As the memories 120 of the memory pools 106 are accessed over NICs 112, 118 and network 104 with TSN capabilities, the bandwidth, latency, and jitter for requests for contents of these memories are deterministic. These memory-specific properties may be passed to the operating system of the platform 102 in any suitable manner, such as through the Heterogeneous Memory Attribute Table (HMAT) provided by Advanced Configuration and Power Interface (ACPI). HMAT may provide memory performance information to the operating system of the platform, including information for the memory pools 106. With this abstraction, the operating system may apply existing memory allocation policies (for example, the operating system may use the fastest memory until it is full, then use the next one, and so on) or create new policies based on awareness of the performance of the memory pools. The operating system may use these properties to match memory locations (e.g., memory pools) with requirements of the various memory flows of the platform 102 or to advertise memory capabilities for applications 108.

In the embodiment depicted, the memory associated with different types of memory flows is referenced by an address space 128 according to different ranges (e.g., a range may comprise consecutive virtual addresses bounded by a starting virtual address and an ending virtual address) associated with the types of memory flows. The physical memory addresses corresponding to the virtual addresses in the address space may be included within memory local to the platform 102 and/or one or more memories 120 of one or more memory pools 106.

In the embodiment depicted, address space 128 includes a guaranteed latency address space 130 in which a range of virtual addresses correspond to memory of one or more flows having a guaranteed latency. Thus, when memory referenced within the guaranteed latency address space 130 is requested, the memory is to be retrieved within the given latency. In some embodiments, the guaranteed latency address space 130 allows the platform 102 to expose access to memory with no jitter and fixed latency.

In various embodiments, address space 128 may include more than one guaranteed latency address space 130. For example, a first guaranteed latency address space may correspond to a first memory flow, a second guaranteed latency address space may correspond to a second memory flow, and so on. As another example, a first guaranteed latency address space may correspond to a first guaranteed latency (e.g., for memory located in a first memory pool), a second guaranteed latency address space may correspond to a second guaranteed latency (e.g., for memory located in a second memory pool), and so on.

In the embodiment depicted, address space 128 also includes a bandwidth oriented address space 132 in which a range of virtual addresses correspond to memory of one or more flows having a guaranteed bandwidth. In the embodiment depicted, address space 128 also includes a guaranteed latency and bandwidth oriented address space 134 in which a range of virtual addresses correspond to memory of one or more flows having a guaranteed latency and a guaranteed bandwidth. Address space 128 may also include a regular address space 136 for memory of one or more flows in which best effort requests are sufficient. The requests associated with this address space may thus be communicated through the TSN network 104 to one or more memory pools 106 on a best-effort base, without timing and delivery guarantees.

When a memory controller receives a request specifying a virtual address in the address space 128, the memory controller may process the request based on the specific address space that contains the virtual address. For example, the memory controller may tag the request with a priority identifier that may be used by the components along the path to the destination memory pool 106 to ensure that any bandwidth or latency guarantees are honored during fulfillment of the request. In some embodiments, the memory controller 110 (e.g., via a special handler discussed in more detail below) may include the request and the corresponding priority identifier in a network packet to be sent to the memory pool 106. In some embodiments, the memory address space 128 is only accessed by a pooled memory traffic handler (e.g., 310 introduced below) while a different memory address space is accessed by the memory controller 110 for memory local to the platform 102 (or initially accessed for memory remote to the platform 102 before control is passed over to the pooled memory traffic handler).

In some embodiments, the operating system of a platform may identify memory performance characteristics for various memory ranges and may optimize the physical location of memory pages based on access frequencies for those memory pages. For example, for memory pages that are accessed relatively frequently over time, the operating system may direct that the memory pages be moved from a remote memory pool 106 to a memory local to the platform 102. As another example, pages with lower predicted access frequency may be pushed from a local memory to remote memory. As yet another example, if a first memory pool (e.g., 106A) is performing poorly relative to a second memory pool (e.g., 106B), the operating system may direct that the pages be moved from the first memory pool to the second memory pool.

Memory controller 110 controls the flow of data going to and from one or more memories (which may be local to the platform 102 or remote to the platform as is the case with memories 120 of one or more memory pools 106). Memory controller 110 may include logic operable to read from a memory, write to a memory, or to request other operations from a memory. In various embodiments, memory controller 110 may receive write requests from an application 108 and may provide data specified in these requests to a memory for storage therein. Memory controller 110 may also read data from a memory and provide the read data to an application 108. During operation, memory controller 110 may translate virtual addresses supplied by an application 108 to physical addresses and may issue commands including one or more physical addresses of a memory in order to read data from or write data to memory (or to perform other operations).

When a memory request references memory that is part of a memory pool 106, the memory controller 110 forward the request to a NIC 112, which sends the request via TSN network 104, to a NIC 118 of the corresponding memory pool 106. The NIC 118 may then pass the request to memory controller 122 to access the memory 120. Any response to the request (e.g., read data, write confirmation, etc.) may be returned along the same path through the illustrated components.

Various components along the path from the memory controller 110 to the memory 120 of the memory pool may include circuitry enabling TSN. For example, NIC 112 includes TSN circuitry 116, components (e.g., switches) of TSN network 104 may include TSN circuitry, NIC 118 includes TSN circuitry 124, and memory controller 122 includes TSN circuitry 126. The TSN capabilities and circuitry will be described in more detail below in connection with FIG. 2.

NIC 112 may be used for the communication of signaling and/or data between platform 102, one or more networks (e.g., TSN network 104), and/or one or more devices or systems coupled to one or more networks (e.g., memory pools 106). NIC 112 may be used to send and receive network traffic such as data packets. A NIC may include electronic circuitry to communicate using any suitable physical layer and data link layer standard such as Ethernet (e.g., as defined by an IEEE 802.3 standard), Fibre Channel, InfiniBand, Wi-Fi, or other suitable standard. Although embodiments herein may describe a TSN network utilizing Ethernet communications, the TSN network may be implemented using any suitable communication mediums that enable communications with guaranteed latencies. A NIC may include one or more physical ports that may couple to a cable (e.g., an Ethernet cable). In various embodiments a NIC may be integrated with a chipset of a platform (e.g., may be on the same integrated circuit or circuit board as a processor of the platform) or may be on a different integrated circuit or circuit board that is electromechanically coupled to the chipset.

A memory pool 106 may include a NIC 118, memory 120, and memory controller 122 (among other components). NIC 118 may have any of the characteristics of NIC 112 and may perform similar functions for a memory pool 106.

Memory controller 122 may include logic to receive requests from one or more platforms 102 (e.g., via NIC 118), cause the requests to be carried out with respect to the memory 120, and provide data associated with the requests to the one or more platforms 102. In some embodiments, memory controller 122 may also be operable to detect and/or correct errors encountered during memory operations via an error correction code (ECC engine). Memory controller 122 may have any suitable characteristics described herein with respect to memory controller 110.

In some embodiments, a request received from a platform 102 may include a virtual address specified by an application 108 running on the platform. The memory controller 122 may translate this virtual address into a physical address and then access (e.g., read or write) memory 120 at the physical address. In other embodiments, the memory controller 110 could perform the translation and include the physical address of the memory 120 within the request sent over the TSN network 104.

In some embodiments, memory controller 122 includes one or more request queues that are dedicated for traffic sent via a TSN channel (e.g., traffic sent by platforms 102 over the TSN network 104 that has a guaranteed latency). Utilizing these requests queues, the memory controller 122 may guarantee a fixed latency for such request queues while using best effort scheduling for the other request queues.

Another TSN feature offered by TSN endpoints (e.g., memory pool 106) compliant with IEEE 802.1Qbv (Enhancements for Scheduled Traffic) is queuing disciplines which controls hardware queuing mechanism support. This permits allocation of one hardware queue for memory pooling traffic, to reduce interference with other traffic classes. An IEEE 802.1Qbv time-aware scheduler may separate communication on an Ethernet network into fixed length, repeating time cycles. This is used to create virtual channels on a given physical network. By scheduling a slice of time for traffic related to memory pooling traffic (e.g., latency guaranteed traffic) only and leaving the rest of the time credit for all other traffic, it is possible to prioritize memory pooling traffic (using time-division multiple access). With traffic shaping, each slice of time is bound to one or multiple hardware queues which are in turn mapped to virtual channels used on the host by memory pooling.

A memory 120 may store any suitable data, such as data used by one or more applications 108 to provide the functionality of a platform 102. In some embodiments, memory 120 may store data and/or sequences of instructions that are executed by processor cores of the platform 102. In various embodiments, a memory 120 may store temporary data, persistent data (e.g., a user's files or instruction sequences) that maintains its state even after power to the memory 120 is removed, or a combination thereof. A memory 120 may be dedicated to a particular platform 102 or shared with other platforms 102 of system 100.

In various embodiments, a memory 120 may include any number of memory partitions and other supporting logic (not shown). A memory partition may include non-volatile memory and/or volatile memory.

Non-volatile memory is a storage medium that does not require power to maintain the state of data stored by the medium, thus non-volatile memory may have a determinate state even if power is interrupted to the device housing the memory. Nonlimiting examples of nonvolatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

Memory 120 may comprise any suitable types of memory and are not limited to a particular speed, technology, or form factor of memory in various embodiments. For example, memory 120 may comprise one or more disk drives (such as solid-state drives), memory cards, memory modules (e.g., dual in-line memory modules) that may be inserted in a memory socket, or other types of memory devices.

Although not depicted, a component or device of system 100 (e.g., platform 102 or memory pool 106) may use a battery and/or power supply outlet connector and associated system to receive power or a display to output data provided by a processor. In various embodiments, the battery, power supply outlet connector, or display may be communicatively coupled to a processor (e.g., of platform 102 or memory pool 106). Other sources of power can be used such as renewable energy (e.g., solar power or motion based power).

Figure 2:
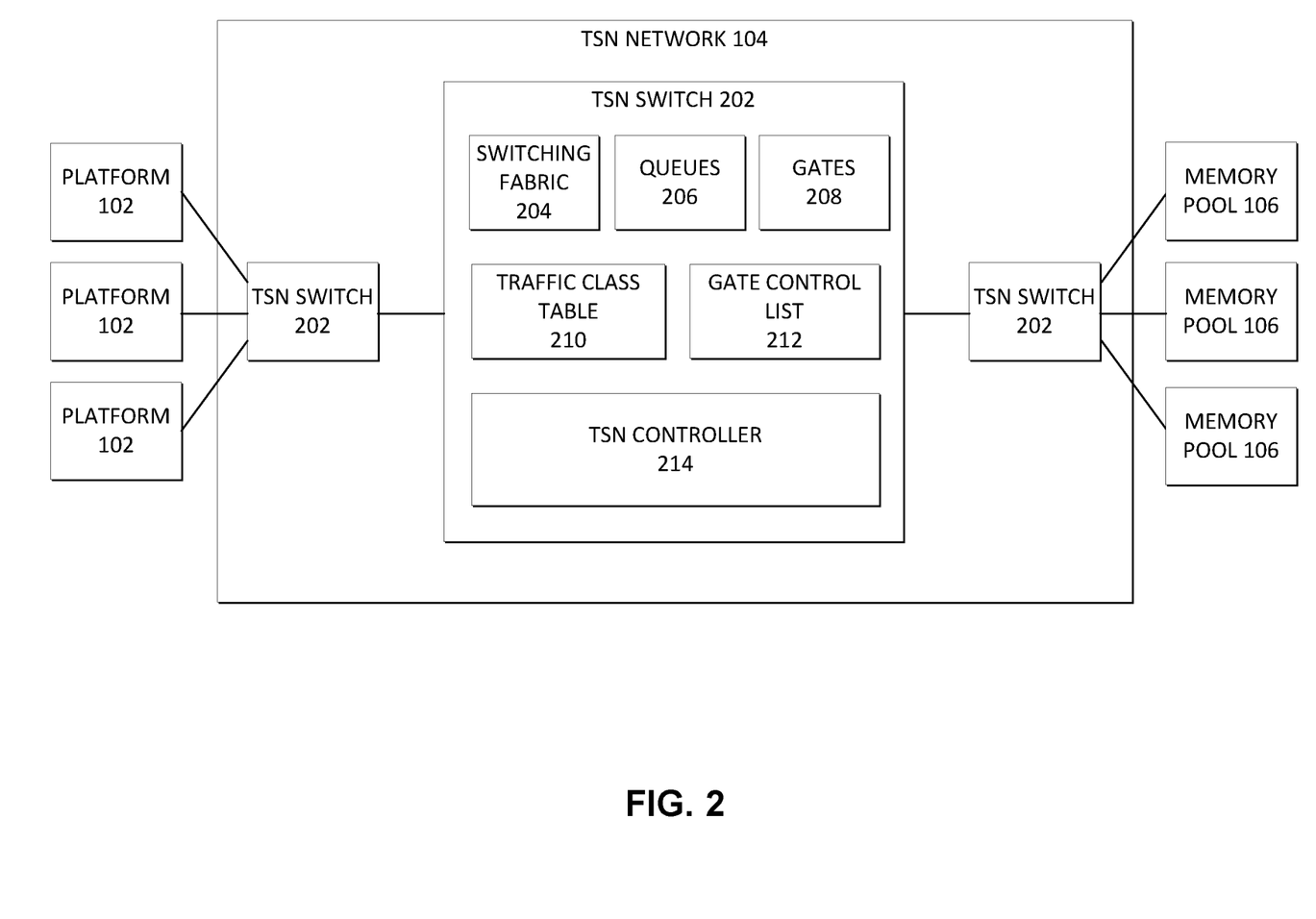
FIG. 2 illustrates a TSN network in accordance with certain embodiments.

FIG. 2 illustrates a TSN network 104 in accordance with certain embodiments. The TSN network 104 couples platforms 102 to memory pools 106 via a series of TSN switches 202. In the embodiment depicted, a TSN switch 202 comprises switching fabric 204, queues 206, gates 208, traffic class table 210, gate control list 212, and TSN controller 214. Any suitable TSN component in system 100 may comprise any one or more of the components of TSN switch 202, where a TSN component may include, for example, a TSN switch 202, other component of the TSN network 104, or TSN circuitry of a component of a platform 102 or memory pool 106 (e.g., TSN circuitry 116, 124, 126).

A TSN path (e.g., through one or more components of platform 102, through network 104, and through one or more components of memory pool 106) may exhibit various characteristics, such as low and deterministic transmission latency (at least for particular network traffic) and synchronized clocks. Streams passing through the TSN path may be given latency and/or bandwidth guarantees. Scheduling and traffic shaping capabilities of the TSN components enable different traffic classes with different priorities on the TSN path, where each priority (e.g., where priorities may be identified by a priority identifier of a packet) may have different requirements for bandwidth and end-to-end latency. In various embodiments, transmission times with guaranteed end-to-end latency may be achieved using one or more priority classes (e.g., of the eight Ethernet priorities as indicated in the Priority Code Point (PCP) field in the 802.1Q VLAN tag of an Ethernet frame) and one or more scheduling or shaping methods (e.g., IEEE 802.1Q strict priority scheduler, IEEE 802.1Qav credit-based traffic shaper, IEEE 802.1Qbv time-aware shaper, or IEEE 802.1Qcr asynchronous shaper).

All components in the TSN path may have a common time reference and may synchronize their clocks with each other. The end devices (e.g., platform 102 and memory pool 106, e.g., through TSN circuitry 116, 124, 126) as well as the components in the TSN network (e.g., switches 202) may participate in the clock synchronization process. Although any suitable mechanisms may be used to synchronize the clocks, in one embodiment, an endpoint or a component in the TSN network 104 acts as a primary controller that keeps a central time source and communicates time information (e.g., via Ethernet frames) with other TSN components to synchronize the clocks. In some embodiments, the clocks may be synchronized using the IEEE 1588 Precision Time Protocol. In the embodiment depicted, the TSN controller 214 may represent the logic that synchronizes the clock of the TSN switch 202 with the central time source for the TSN path.

Switching fabric 204 may comprise interconnect selectively coupling input ports of the TSN switch 202 to output ports of the TSN switch 202. Switching fabric 204 may also comprise circuitry to configure the coupling of an input port on which a memory request is received to an output port based on information in the memory request (e.g., a source address, a destination address, and/or other address information).

Queues 206 may be used to store packets or packet identifiers based on priorities of the packets. In various embodiments, the queues 206 may be used to implement guaranteed latency for packet streams. The packets (or identifiers thereof) may be routed to the queues 206 based on a traffic class table 210. The traffic class table 210 may map a priority indication (e.g., traffic class) of a packet to a queue 206. As just one example, the traffic class table 210 may map a Priority Code Point (PCP) to a queue 206. In some embodiments, a high priority class may be mapped to multiple queues.

In some embodiments, each queue may be associated with a gate. When the gate associated with a queue is open, packets from that queue may be transmitted through the TSN path, while the gates associated with the other queues are closed and thus packets from these queues are not transmitted through the TSN path. Gate control list 212 may include a schedule for opening the gates associated with the queues. In various embodiments, the gate control list 212 may be coordinated among the components of the TSN path so that traffic of the same priority may be communicated through the TSN path during the time dedicated to that priority. This may ensure a guaranteed maximum latency (and/or a guaranteed bandwidth) for sending frames.

In various embodiments, communication over the TSN path may utilize a time-division multiple access scheme in which communication over the TSN path is split into repeating time cycles with fixed lengths. Within a cycle, different time slices may be assigned to one or more priorities. This allows exclusive use of a transmission medium for a period of time for a traffic class that needs a transmission guarantee.

By utilizing the TSN network 104 and the various TSN circuitry in a platform 102 and a memory pool 106, the traffic associated with memory pooling may share the TSN network 104 with existing traffic classes. In some embodiments, the TSN components may be compliant with IEEE 802.1Q-2018 (or other standard enabling guaranteed minimum latency for requests) and thus may allow predictable time of delivery by utilizing Ethernet traffic divided into different classes thus ensuring that, at specific times, only one traffic class (or set of traffic classes) has access to the network. This may guarantee the performance of memory pooling traffic without interfering with existing isochronous, low-latency, high-priority traffic. Low priority IP-based communication can continue to take place with another "best effort" traffic class.

TSN controller 214 may also communicate with one or more other TSN components to determine a link latency of one or more of the hops of the TSN path (e.g., from the NIC 112 of a platform 102 to the memory 120 of the memory pool 106). The TSN controller 214 may operate collectively with TSN controllers 214 of other TSN components to determine the link latency of each hop of the TSN path (e.g., the latency to send to the next hop and/or the latency to receive a response from the next hop). These link latencies may then be reported to the platform 102 and the platform 102 may aggregate the link latencies to determine the round trip time for a memory request to a memory 120 of a memory pool 106 (alternatively a TSN component may calculate the round trip time and report this to platform 102). In some embodiments, the round trip latency calculated may be the latency between the NIC 112 of the platform and the NIC 118 of the memory pool 106, although in other embodiments, this round trip latency may include the latency through other components of the platform 102 or memory pool 106 (e.g., memory controller 110, memory controller 122, etc.). In some embodiments, PTP may be utilized to determine each of the latencies.

Figure 3:
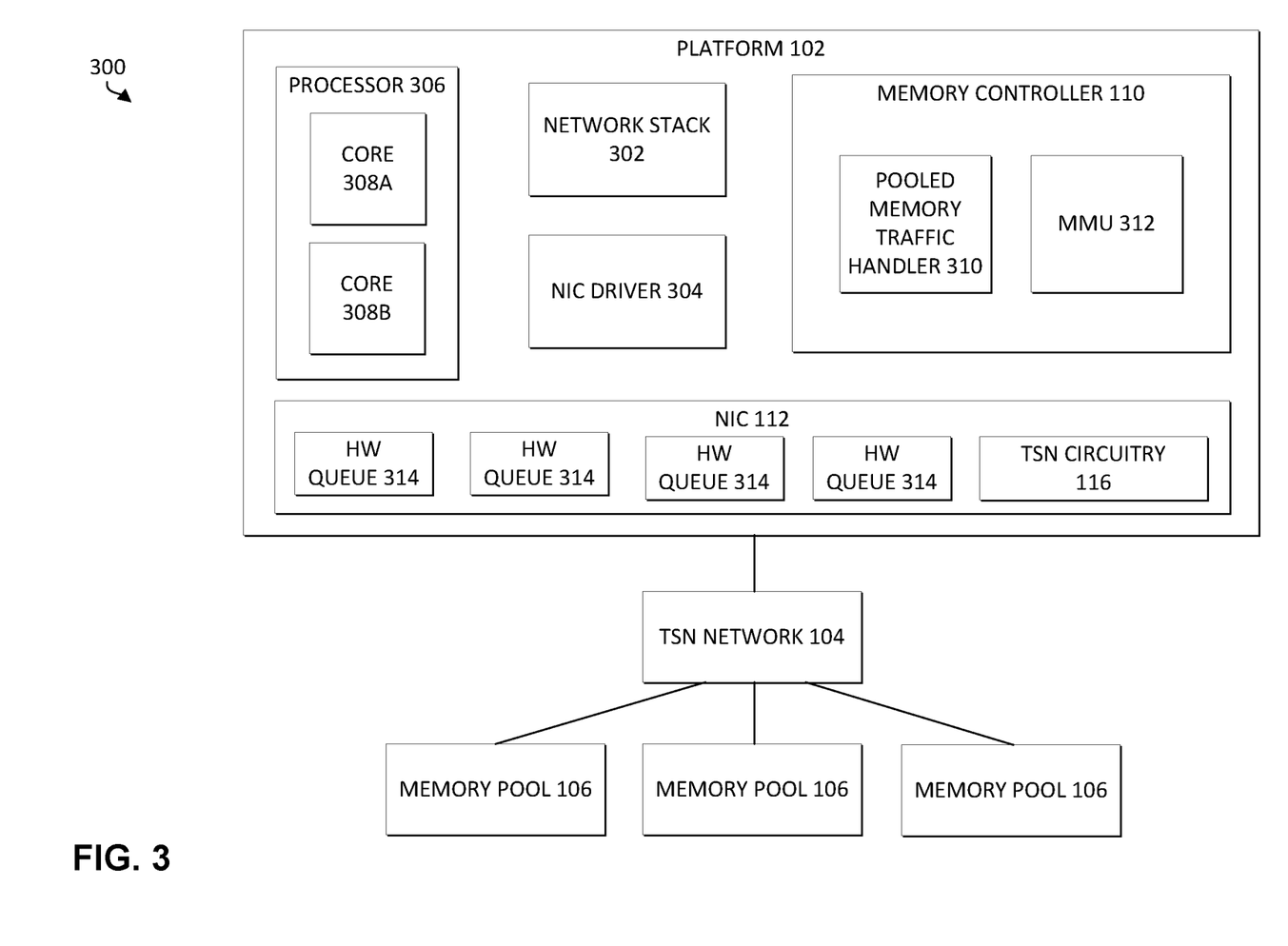
FIG. 3 illustrates a platform within a memory pooled TSN based architecture in accordance with certain embodiments.

FIG. 3 illustrates a platform 102 within a system 300 comprising a memory pooled TSN based architecture in accordance with certain embodiments. In the embodiment depicted, platform 102 comprises a network stack 302, a NIC driver 304, a processor 306, a memory controller 110, and a NIC 112.

In the embodiment depicted, the memory controller 110 includes a pooled memory traffic handler 310 and a memory management unit (MMU) 312. The MMU 312 may include circuitry to implement various memory access related features, such as one or more of access protection, virtual-to-physical address translation, and memory caching operations. In various embodiments, the MMU 312 may manage a page table that includes virtual-to-physical address translations for memory that is local to the platform 102 as well as a translation look-aside buffer (TLB) to accelerate virtual-to-physical address translations (e.g., the TLB may cache these translations to avoid a page table lookup).

When an application 108 requests data from a memory that is local to the platform 102, the physical address of the memory may be obtained from the virtual address supplied by the application through the TLB or through a page walk if the TLB doesn't have the translation cached.

The memory controller 110 also includes a pooled memory traffic handler 310. When an application 108 requests data from memory using a virtual memory address that refers to a physical address in a memory pool 106, the operating system of platform 102 may issue a page fault since the memory is not local to the platform 102. The page fault may be handled by the pooled memory traffic handler 310.

Pooled memory traffic handler 310 may include any suitable logic to handle a page fault and request data from one or more memory pools 106. In some embodiments, the pooled memory traffic handler 310 is implemented at least in part in software (e.g., executed by processor 306). For example, handler 310 may comprise an in-kernel execution engine (such as the Berkeley Packet Filter (BPF) or extended BPF (eBPF)) that processes a virtual instruction set to extend kernel functionality. Thus, in some embodiments, the pooled memory traffic handler 310 may run in the kernel space. Various embodiments may expand the existing set of bindings to kernel functions in BPF so that BPF programs (which may be compiled and run by the processor 306) can interact with the OS memory management functions directly, such as hooks on page fault and access to pages. A BPF program may include a sequence of the instructions (such as those described above) that makes use of hooks. Some BPF programs are used for communication with the NIC 112 while other BPF programs may be used to interact with the memory controller (e.g., when handling a page fault).

When a request from an application 108 refers to a memory address that is remote to the platform 102, the pooled memory traffic handler 310 may determine which memory pool 106 includes the memory 120 corresponding to the memory address and then create one or more network packets to request access to the memory of the appropriate memory pool. In one embodiment, a packet to be sent from the platform 102 to the memory pool 106 may include the virtual address supplied by the application 108 as well as an identifier of the memory pool 106 so that TSN network 104 can communicate the packet to the appropriate memory pool 106. The handler 310 may also determine whether the virtual address is included within a guaranteed latency address space (e.g., 130), a bandwidth oriented address space (e.g., 132), or a guaranteed latency and bandwidth oriented address space (e.g., 134) and may include a corresponding priority identifier (e.g., traffic class) in the one or more packets. The one or more network packets are then made available to the NIC driver 304. In various embodiments, a BPF program may pass the network packets from the pooled memory traffic handler 310 to the NIC driver (or a direct hardware channel could be used, e.g., if the pooled memory traffic handler 310 is implemented by specialized hardware as described below).

In generating the network packets and providing the network packets to the NIC driver 304, the pooled memory traffic handler 310 may bypass a network stack 302 executed by the operating system. The network stack 302 may typically generate packets that are to be sent on one or more networks coupled to the platform 102. For example, the network stack 302 may comprise a TCP/IP network stack comprising an application layer, a TCP/IP layer, and an Ethernet layer. An application executed by the platform 102 may present data to the TCP/IP layer. The TCP/IP layer may segment the data into one or more frames and add a TCP/IP header to each frame. The Ethernet layer may add an Ethernet header and pass the generated packets to the NIC driver 304. Other embodiments may utilize any suitable network stacks. The pooled memory traffic handler 310 may bypass the network stack 302 in order to avoid latency and jitter that could be introduced by the network stack 302 into memory access requests sent to one or more memory pools. In some embodiments, an eXpress Data Path (XDP) (an eBPF based high performance data path) in the kernel may be used to bypass the standard network stack.

In some embodiments, circuitry may be used to perform some or all of the functions of the pooled memory traffic handler 310. For example, as described above, at least a portion of the handler 310 may be software executed by circuitry of the processor 306. As another example, at least a portion of handler 310 may be implemented using specialized hardware that acts as a bridge between the MMU 312 and the NIC 112.

NIC driver 304 represents one or more software components that allow the pooled memory traffic handler 310 (or other software executed by an operating system of platform 102) to communicate with the NIC 112. The NIC driver 304 may manage hardware queues 314 of the NIC and may receive notifications when packets arrive or need to be sent.

In some embodiments, the NIC driver 304 may implement some or all of the pooled memory traffic handler 310. In various embodiments, the pooled memory traffic handler 310 may be implemented at least in part by the NIC 112 itself. For example, NIC driver 304 and/or the NIC 112 may execute BPF programs. Such embodiments may allow incoming or outgoing packets to be processed with zero copy.

In the embodiment depicted, NIC 112 includes a plurality of hardware queues 314 to store incoming or outgoing packets (or packet identifiers). In some embodiments, one or more of the hardware queues 314 may be dedicated for memory pooling traffic (e.g., to reduce interference to or by other traffic classes). In some embodiments, a hardware queue 314 may be reserved for a particular class of traffic (e.g., for guaranteed latency traffic). This feature, combined with a data path that bypasses the network stack 302, may provide guaranteed latency for the path from the NIC 112 to the MMU 312.

When packets are received on the NIC 112 from one of the memory pools 106 via the TSN network 104, the packets (or identifiers thereof) may be placed in one or more hardware queues 314). The pooled memory traffic handler 310 (e.g., via a BPF program, other software, specialized hardware, etc.) may then extract the relevant data (e.g., the data accessed from a memory 120 of a memory pool if the original memory access request was a read request or a confirmation if the original memory access request was a write request) from the packets to the MMU 312, while bypassing the network stack 302 of the operating system. This bypassing may promote improved performance and provide deterministic latency for the request.

Processor 306 may comprise any suitable process, such as a microprocessor, an embedded processor, a digital signal processor (DSP), a network processor, a handheld processor, an application processor, a co-processor, an SOC, or other device to execute code (e.g., software instructions). Processor 306, in the depicted embodiment, includes two processing elements (cores 308A and 308B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 308 (e.g., 308A or 308B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

A memory pool 106 may include any one or more components that are shown in FIG. 3 for platform 102 and such components may perform corresponding operations for the memory pool 106.

Figure 4:
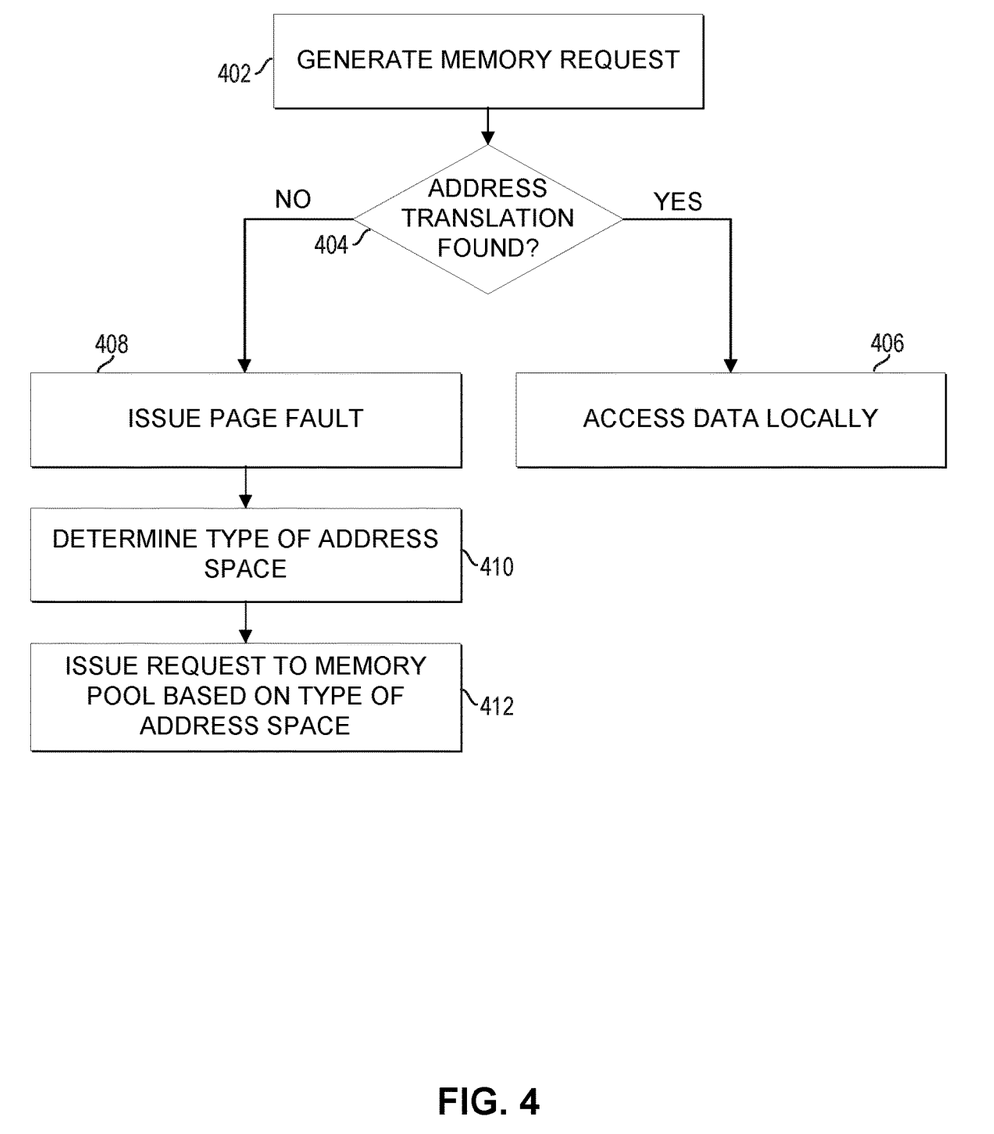
FIG. 4 illustrates a flow for providing guaranteed latency for a memory request in accordance with certain embodiments.

FIG. 4 illustrates a flow for providing guaranteed latency for a memory request in accordance with certain embodiments. At 402, a memory request is generated (e.g., by an application 108). At 404, a determination is made as to whether an address translation is found for the memory request. For example, a TLB may be checked and if the address translation is not found there, a page table may be checked. If the translation is found in the TLB or the page table, the data is accessed locally at 406.

If the address translation is not found, the flow moves to 408, where a page fault is issued. The page fault may be handled (e.g., by pooled memory traffic handler 310). This may involve determining what type of address space includes an address specified by the memory request 410 and then issuing a request to a memory pool based on the type of the address space at 412. For example, if the address space is a guaranteed latency address space, a packet including the request may be generated with a priority identifier associated with the guaranteed latency and directed to a path providing the guaranteed latency for completion of the memory request The flow described in FIG. 4 is merely representative of operations that may occur in particular embodiments. Some of the operations illustrated in the FIGS. may be repeated, combined, modified, or deleted where appropriate. Additionally, operations may be performed in any suitable order without departing from the scope of particular embodiments.

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable storage medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components displayed in the FIGS. or other entity or component described herein, or subcomponents of any of these. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, e.g. reset, while an updated value potentially includes a low logical value, e.g. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (e.g., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a The machine-readable storage medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage medium used in the transmission of information over the Internet via electrical, optical, acoustical or other forms of propagated signals (e.g., carrier waves, infrared signals, digital signals, etc.). Accordingly, the computer-readable medium includes any type of tangible machine-readable storage medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes a system comprising a traffic handler comprising circuitry to determine that data of a memory request is stored remotely in a memory pool; generate a packet based on the memory request; and direct the packet to a path providing a guaranteed latency for completion of the memory request.

Example 2 includes the subject matter of Example 1, and wherein the path includes a first network interface controller (NIC) of a platform comprising the traffic handler, a time sensitive networking (TSN) network, and a second NIC of the memory pool.

Example 3 includes the subject matter of any of Examples 1 and 2, and further including the first NIC, wherein the first NIC comprises TSN circuitry to synchronize a clock and transmission schedule with a plurality of TSN components of the TSN network.

Example 4 includes the subject matter of any of Examples 1-3, the traffic handler further to direct the packet to the path providing the guaranteed latency responsive to a determination that a virtual address of the memory request is within a range of virtual addresses associated with the guaranteed latency, wherein the range is bounded by a start address and an end address.

Example 5 includes the subject matter of any of Examples 1-4, the traffic handler further to assign a priority identifier associated with the guaranteed latency to the packet responsive to the determination that the virtual address of the memory request is within the range of virtual addresses associated with the guaranteed latency.

Example 6 includes the subject matter of any of Examples 1-5, and wherein the range of virtual addresses is within an address space further including a second range of virtual addresses associated with a guaranteed bandwidth.

Example 7 includes the subject matter of any of Examples 1-6, and wherein the traffic handler is to handle the memory request responsive to a page fault indicating that the data is not stored locally.

Example 8 includes the subject matter of any of Examples 1-7, and wherein the traffic handler is implemented at least in part by an in-kernel execution engine.

Example 9 includes the subject matter of any of Examples 1-8, wherein the in-kernel execution engine comprises a Berkeley Packet Filter or extended Berkeley Packet Filter.

Example 10 includes the subject matter of any of Examples 1-9, further comprising a processor core to execute an application to generate the memory request.

Example 11 includes a method comprising determining that data of a memory request is stored remotely from a platform in a memory pool; generating a packet based on the memory request; and directing the packet to a path providing a guaranteed latency for completion of the memory request.

Example 12 includes the subject matter of Example 11, and wherein the path includes a first network interface controller (NIC) of the platform, a time sensitive networking (TSN) network, and a second NIC of the memory pool.

Example 13 includes the subject matter of any of Examples 11 and 12, and further including directing the packet to the path providing the guaranteed latency responsive to a determination that a virtual address of the memory request is within a range of virtual addresses associated with the guaranteed latency, wherein the range is bounded by a start address and an end address.

Example 14 includes the subject matter of any of Examples 11-13, and further including assigning a priority identifier associated with the guaranteed latency to the packet responsive to the determination that the virtual address of the memory request is within the range of virtual addresses associated with the guaranteed latency.

Example 15 includes the subject matter of any of Examples 11-14, further comprising generating the packet responsive to a page fault indicating that the data is not stored locally.

Example 16 includes the subject matter of any of Examples 11-15, wherein the first NIC comprises TSN circuitry to synchronize a clock and transmission schedule with a plurality of TSN components of the TSN network.

Example 17 includes the subject matter of any of Examples 11-16, wherein the range of virtual addresses is within an address space further including a second range of virtual addresses associated with a guaranteed bandwidth.

Example 18 includes the subject matter of any of Examples 11-17, wherein the traffic handler is implemented at least in part by an in-kernel execution engine.

Example 19 includes the subject matter of any of Examples 11-18, wherein the in-kernel execution engine comprises a Berkeley Packet Filter or extended Berkeley Packet Filter.

Example 20 includes the subject matter of any of Examples 11-19, further comprising executing, by a processor core, an application to generate the memory request.

Example 21 includes at least one non-transitory machine readable storage medium having instructions stored thereon, the instructions when executed by a machine to cause the machine to determine that data of a memory request is stored remotely in a memory pool; generate a packet based on the memory request; and direct the packet to a path providing a guaranteed latency for completion of the memory request.

Example 22 includes the subject matter of Example 21, wherein the path includes a first network interface controller (NIC) of a platform comprising the traffic handler, a time sensitive networking (TSN) network, and a second NIC of the memory pool.

Example 23 includes the subject matter of any of Examples 21 or 22, the instructions when executed by the machine to cause the machine to direct the packet to the path providing the guaranteed latency responsive to a determination that a virtual address of the memory request is within a range of virtual addresses associated with the guaranteed latency, wherein the range is bounded by a start address and an end address.

Example 24 includes the subject matter of any of Examples 21-23, the instructions when executed by the machine to cause the machine to assign a priority identifier associated with the guaranteed latency to the packet responsive to the determination that the virtual address of the memory request is within the range of virtual addresses associated with the guaranteed latency.

Example 25 includes the subject matter of any of Examples 21-24, the instructions when executed by the machine to cause the machine to generate the packet responsive to a page fault indicating that the data is not stored locally.

Example 26 includes the subject matter of any of Examples 21-25, wherein the first NIC comprises TSN circuitry to synchronize a clock and transmission schedule with a plurality of TSN components of the TSN network.

Example 27 includes the subject matter of any of Examples 21-26, wherein the range of virtual addresses is within an address space further including a second range of virtual addresses associated with a guaranteed bandwidth.

Example 28 includes the subject matter of any of Examples 21-27, wherein the traffic handler is implemented at least in part by an in-kernel execution engine.

Example 29 includes the subject matter of any of Examples 21-28, wherein the in-kernel execution engine comprises a Berkeley Packet Filter or extended Berkeley Packet Filter.

Example 30 includes the subject matter of any of Examples 21-29, the instructions when executed to execute an application to generate the memory request.

What is claimed is:

1. A system comprising:
a traffic handler comprising circuitry to:
based on a virtual address of a memory request, determine that data stored at a location referred to by the virtual address of the memory request is stored remotely in a memory pool;
generate a packet based on the memory request; and
direct the packet to a path providing a guaranteed latency for completion of the memory request, wherein the path comprises a first network interface controller (NIC) of a platform comprising the traffic handler, a second NIC of the memory pool, and a time sensitive networking (TSN) network between the first NIC of the platform and the second NIC of the memory pool, wherein the traffic handler is to direct the packet to the path providing the guaranteed latency responsive to a determination that the virtual address is within a range of an address space, the range comprising consecutive virtual addresses associated with the guaranteed latency, wherein the guaranteed latency is provided to memory requests for memory locations within the range.

2. The system of claim 1, wherein the traffic handler is implemented at least in part by an in-kernel execution engine and is to handle the memory request responsive to a page fault indicating that the data is not stored locally.

3. The system of claim 1, further comprising the first NIC, wherein the first NIC comprises TSN circuitry to synchronize a clock and transmission schedule with a plurality of TSN components of the TSN network.

4. The system of claim 1, wherein the address space further comprises a second range of virtual addresses, wherein memory requests for memory locations within the second range are communicated through the TSN network on a best-effort basis without bandwidth or latency guarantees.

5. The system of claim 1, the traffic handler further to assign a priority identifier associated with the guaranteed latency to the packet responsive to the determination that the virtual address of the memory request is within the range of virtual addresses associated with the guaranteed latency.

6. The system of claim 4, wherein the address space further comprises a third range of virtual addresses associated with a guaranteed bandwidth, wherein the guaranteed bandwidth is provided to memory requests for memory locations within the third range.

7. The system of claim 1, wherein the TSN network is coupled to a plurality of memory pools through respective NICs of the memory pools.

8. The system of claim 1, wherein the traffic handler is implemented at least in part by an in-kernel execution engine.

9. The system of claim 8, wherein the in-kernel execution engine comprises a Berkeley Packet Filter or extended Berkeley Packet Filter.

10. The system of claim 1, further comprising a processor core to execute an application to generate the memory request.

11. A method comprising:
based on a virtual address of a memory request, determining that data stored at a location referred to by the virtual address of the memory request is stored remotely from a platform in a memory pool;
generating a packet based on the memory request; and
directing the packet to a path providing a guaranteed latency for completion of the memory request, wherein the path comprises a first network interface controller (NIC) of a platform at which the memory request is generated, a second NIC of the memory pool, and a time sensitive networking (TSN) network between the first NIC of the platform and the second NIC of the memory pool, wherein the packet is directed to the path providing the guaranteed latency responsive to a determination that the virtual address is within a range of an address space, the range comprising consecutive virtual addresses associated with the guaranteed latency, wherein the guaranteed latency is provided to memory requests for memory locations within the range.

12. The method of claim 11, wherein a guaranteed bandwidth is also provided to memory requests for memory locations within the range.

13. The method of claim 11, wherein the range is bounded by a start address and an end address.

14. The method of claim 11, further comprising assigning a priority identifier associated with the guaranteed latency to the packet responsive to the determination that the virtual address of the memory request is within the range of virtual addresses associated with the guaranteed latency.

15. The method of claim 11, further comprising generating the packet responsive to a page fault indicating that the data is not stored locally.

16. At least one non-transitory machine readable storage medium having instructions stored thereon, the instructions when executed by a machine to cause the machine to:
based on a virtual address of a memory request, determine that data stored at a location referred to by the virtual address of the memory request is stored remotely in a memory pool;
generate a packet based on the memory request; and
direct the packet to a path providing a guaranteed latency for completion of the memory request, wherein the path comprises a first network interface controller (NIC) of a platform, a second NIC of the memory pool, and a time sensitive networking (TSN) network between the first NIC of the platform and the second NIC of the memory pool, wherein the packet is directed to the path providing the guaranteed latency responsive to a determination that the virtual address is within a range of an address space, the range comprising consecutive virtual addresses associated with the guaranteed latency, wherein the guaranteed latency is provided to memory requests for memory locations within the range.

17. The at least one non-transitory machine readable storage medium of claim 16, wherein a guaranteed bandwidth is also provided to memory requests for memory locations within the range.

18. The at least one non-transitory machine readable storage medium of claim 16, wherein the range is bounded by a start address and an end address.

19. The at least one non-transitory machine readable storage medium of claim 16, the instructions when executed by the machine to cause the machine to assign a priority identifier associated with the guaranteed latency to the packet responsive to the determination that the virtual address of the memory request is within the range of virtual addresses associated with the guaranteed latency.

20. The at least one non-transitory machine readable storage medium of claim 16, the instructions when executed by the machine to cause the machine to generate the packet responsive to a page fault indicating that the data is not stored locally.

* * * * *